(12) United States Patent
Park

(10) Patent No.: US 6,672,595 B2
(45) Date of Patent: Jan. 6, 2004

(54) PRESSURE CONTROLLABLE PACKING

(76) Inventor: Jong Peter Park, 1630 Summitridge Dr., Diamond Bar, CA (US) 91765

( * ) Notice: Subject to any disclaimer, the term of this patent is extended or adjusted under 35 U.S.C. 154(b) by 0 days.

(21) Appl. No.: 10/213,006

(22) Filed: Aug. 6, 2002

(65) Prior Publication Data

US 2003/0209865 A1 Nov. 13, 2003

(30) Foreign Application Priority Data

Jun. 21, 2002 (KR) .................................. 10-2002-0034800

(51) Int. Cl.[7] ........................... F16J 15/02; B65D 51/16; B65D 41/06; B65D 41/36
(52) U.S. Cl. ........................ 277/628; 277/630; 277/641; 277/642; 277/644; 220/203.09; 220/298
(58) Field of Search ................................. 277/628, 630, 277/637, 640, 641, 642, 644, 647, 649, 648; 220/203.09, 298

(56) References Cited

U.S. PATENT DOCUMENTS

| | | | |
|---|---|---|---|
| 2,399,115 A | * | 4/1946 | Hansen et al. .............. 220/298 |
| 2,600,703 A | | 6/1952 | Storm |
| 2,600,714 A | | 6/1952 | Wenscott et al. |
| 4,254,960 A | * | 3/1981 | Jelinek ........................ 277/644 |
| 4,276,990 A | | 7/1981 | Chiodo |
| 4,434,909 A | * | 3/1984 | Ott .............................. 220/316 |
| 4,592,479 A | | 6/1986 | Resende |
| 4,932,550 A | * | 6/1990 | Moucha .................. 220/203.09 |
| 5,641,085 A | | 6/1997 | Lonbardo |
| 5,678,721 A | * | 10/1997 | Cartigny et al. ............ 220/316 |

FOREIGN PATENT DOCUMENTS

JP  2000240800 A  *  9/2000  ............ F16J/15/10

* cited by examiner

*Primary Examiner*—Chuck Y. Mah
*Assistant Examiner*—Vishal Patel

(57) ABSTRACT

Disclosed is a pressure controllable packing. In an elastic backing installed at a packing groove formed at an edge of a cover so as to isolate an inner space defined by a vessel and the cover from an outer space, the present invention includes first and second rims pushed by a pressure of the inner space in directions tending to adhere closely to a surface of the packing groove and an edge surface of the vessel, a support part installed at a circumference end of the packing groove so as to be contacted with the circumference end and connecting the first and second rims to each other, and at least one long groove formed at a portion of the support part at which the first and second rims are connected to the support part, wherein the first or second rim at a portion where the long groove is formed is pushed in a circumferential direction so as to generate a distorted portion if a pressure of the inner space increases to exceed a predetermined value, and wherein a gap is generated from the distorted portion between surfaces of the first and second rim and the long groove or the edge surface of the vessel so as to reduce the pressure of the inner surface through the gap.

6 Claims, 3 Drawing Sheets

PRESSURE CONTROLLABLE PACKING

CROSS REFERENCE TO RELATED ART

This application claims the benefit of Korean Patent Application No. 2002-0034800, filed on Jun. 21, 2002, which is incorporated by reference in its entirety.

BACKGROUND OF THE INVENTION

1. Field of the Invention

The present invention relates to a pressure controllable packing enabling to control a pressure by making a fluid leak through a leakage path of the fluid provided in the packing if an inner pressure of a pressurization vessel exceeds a predetermined value.

2. Background of the Related Art

Generally, a packing is used for making a pressurization vessel airtight. Namely, an inner space of a vessel is sealed up from outside using a packing made of a flexible or elastic material so as to achieve a perfect coupling between the pressurization vessel and a cover or stopper.

There are various pressurization vessels for cookers such as a pressurization pan, a pressurization pot, a pressurization cooker, and the like. These vessels enable to cook by heating contents such as food and the like therein using a pressure higher than an atmospheric pressure. Such a pressurization vessel is exposed to explosion due to the increasing pressure inside the vessel by heating, whereby a safety valve is essential to be installed for safety. Yet, if hogwash sticks to the safety valve or degradation occurs in the safety valve used for a long term, the safety valve becomes out of order or broken down. Therefore, double or triple safety devices are required preferably.

The packing for the pressurization vessel according to the related art is mainly made of a silicon rubber as an elastic body. And, such a packing is installed so as to be contacted with an edge coupling portion between the cover and vessel body, whereby the packing adheres more closely to the edge coupling portion by an increasing force generated from the increasing pressure inside the vessel.

SUMMARY OF THE INVENTION

Accordingly, the present invention is directed to a pressure controllable packing that substantially obviates one or more problems due to limitations and disadvantages of the related art.

An object of the present invention is to provide a pressure controllable packing having a pressure controlling function by itself.

Another object of the present invention is to provide a pressure controllable packing of which portion is distorted if a pressure exceeds a predetermined value to lose the pressure through the distorted portion so as to have a pressure controlling function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an elastic packing installed at a packing groove formed at an edge of a cover so as to isolate an inner space defined by a vessel and the cover from an outer space, a pressure controllable packing according to the present invention includes first and second rims pushed by a pressure of the inner space in directions tending to adhere closely to a surface of the packing groove and an edge surface of the vessel, a support part installed at a circumference end of the packing groove so as to be contacted with the circumference end and connecting the first and second rims to each other, and at least one long groove formed at a portion of the support part at which the first and second rims are connected to the support part, wherein the first or second rim at a portion where the long groove is formed is pushed in a circumferential direction so as to generate a distorted portion if a pressure of the inner space increases to exceed a predetermined value, and wherein a gap is generated from the distorted portion between surfaces of the first and second rim and the long groove or the edge surface of the vessel so as to reduce the pressure of the inner surface through the gap.

Preferably, a portion of the first or second rim to be placed in the long groove is narrower than a rest portion of the first or second rim, whereby the pressure can be controlled by adjusting a width of the portion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
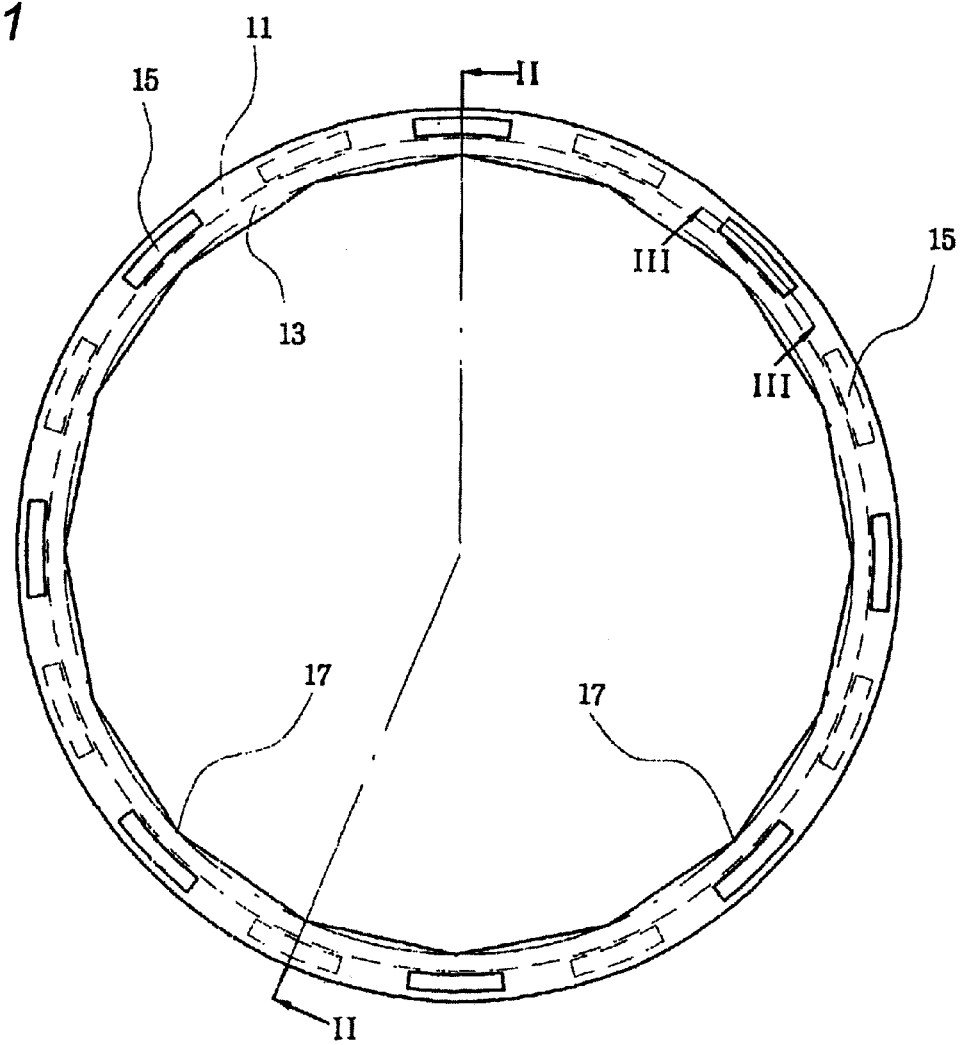
FIG. 1 illustrates a layout of a pressure controllable packing according to the present invention.
Figure 2:
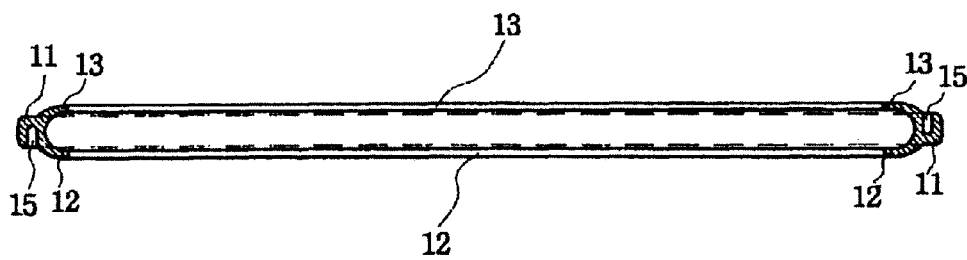
FIG. 2 illustrates a cross-sectional view of the pressure controllable packing along a cutting line II—II in FIG. 1.
Figure 3:
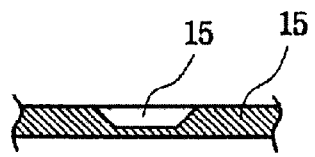
FIG. 3 illustrates a cross-sectional view of the pressure controllable packing along a cutting line III—III in FIG. 1.

FIG. 1 illustrates a layout of a pressure controllable packing according to the present invention, FIG. 2 illustrates a cross-sectional view of the pressure controllable packing along a cutting line II—II in FIG. 1, and FIG. 3 illustrates a cross-sectional view of the pressure controllable packing along a cutting line III—III in FIG. 1.

The present invention relates to an elastic packing installed at a packing groove formed at a cover edge so as to make an inner space, which is defined by a vessel and a cover, airtight from an outer space. The packing according to the present invention can be installed at any vessel having a cover such as a cooking pan, a pot, a rice kettle, a steam cooker, a rice steam cooker, a pressurization steam cooker, a pressurization cooker, or the like.

A packing according to the present invention includes a pair of rims, a support part, and a long groove.

A pair of the rims include first and second rims 12 and 13 which are pushed by a pressure of an inner space of a pressurization vessel in directions tending to adhere closely to surfaces of a packing groove and an edge of a vessel, respectively.

A support part 11 is built in one body of the first and second rims 12 and 13 so as to be contacted with a circumference end of the packing groove. And, the support part 11 is attached to the circumference end so as not to be pushed any further even if the pressure increases.

At least one long groove 15 is formed at a portion at which the first and second rims 12 and 13 are connected to the support part 11. The long groove 15 has a depth amounting to at least 50% of a thickness of the support part 11, and a bottom area of the long groove 15 is formed to be narrower than an entrance area of the long groove 15.

The number of the long grooves 15 should be at least one. Preferably, at least three long grooves are formed in equal interval so as to balance a pressure control. More preferably, the number of the long grooves 15 is twelve to twenty. The long grooves 15, as shown in FIG. 1, are preferably formed alternately at upper and lower faces of the support part 11. The packing is inserted in the packing groove so as to become equivalent in upper and lower shapes, whereby the same result of adjustment is achieved regardless of installment directions.

Figure 4:
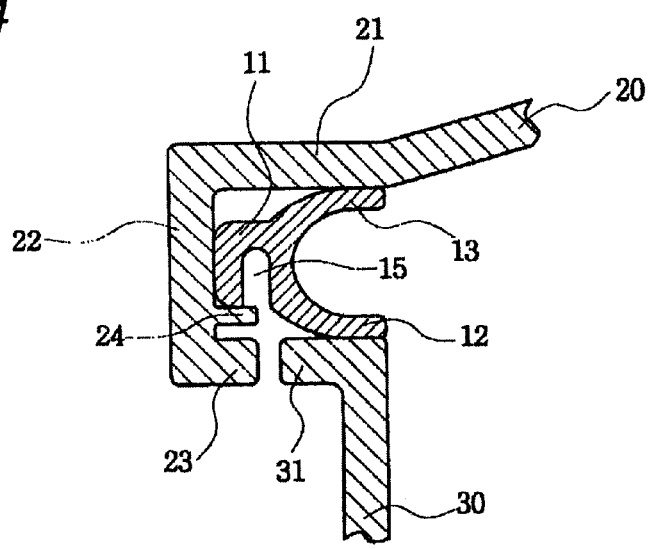
FIG. 4 illustrates a cross-sectional view of a packing installed at a cover of a pressurization vessel according to the present invention in part.

The above-explained packing according to the present invention, as shown in FIG. 4, is installed at a packing groove formed at the cover of the pressurization vessel.

An edge of a cover 20 is bent like "[" so as to form the packing groove. The packing groove includes an upper portion 21, a lateral portion 22, and a lower portion 23. And, a packing fixing protrusion 24 is formed continuously or intermittently at the packing groove so as to support the support part 11 to position the packing in the packing groove properly.

In the preferred embodiment, the pressurization vessel 30 comprises an edge surface having a diameter less than the diameter of the cover 20 so as to form a small space between the edge surface 31 and the lower portion 23. When the cover 20 is coupled with the pressurization vessel 30 and in particular when pressure not exceeding the predetermined pressure level is applied, the edge surface 31 makes contact with the pressure controllable packing so as to seal the inner space of the pressurization vessel 30. When the pressure exceeds a predetermined level, a distortion is formed on the pressure controllable packing and excess pressure is discharged through the small space formed between the edge surface 31 and the lower portion 23.

The packing of the present invention is installed at the packing groove formed at the cover. And, the cover is coupled with a pressurization vessel 30. A partial cross-section of the above-coupled edge portion is shown in FIG. 4.

When food or liquid is put in an inner space defined by the cover and vessel so as to be heated, as shown in FIG. 4, a pressure of the inner space starts to increase.

Figure 5:
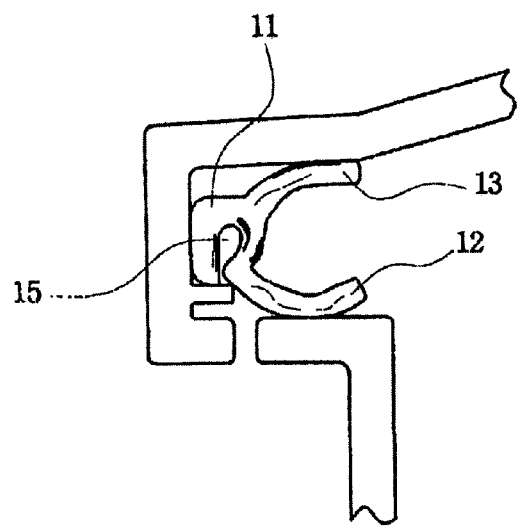
FIG. 5 and FIG. 6 illustrate diagrams for explaining that a packing according to the present invention is installed at a cover of a pressurization vessel so as to activate a pressure controlling function substantially.

When the pressure exceeds a predetermined value, as shown in FIG. 5, the first or second rim at the portion where the long groove is formed is pushed toward the long groove so as to generate distortion thereof.

Figure 6:
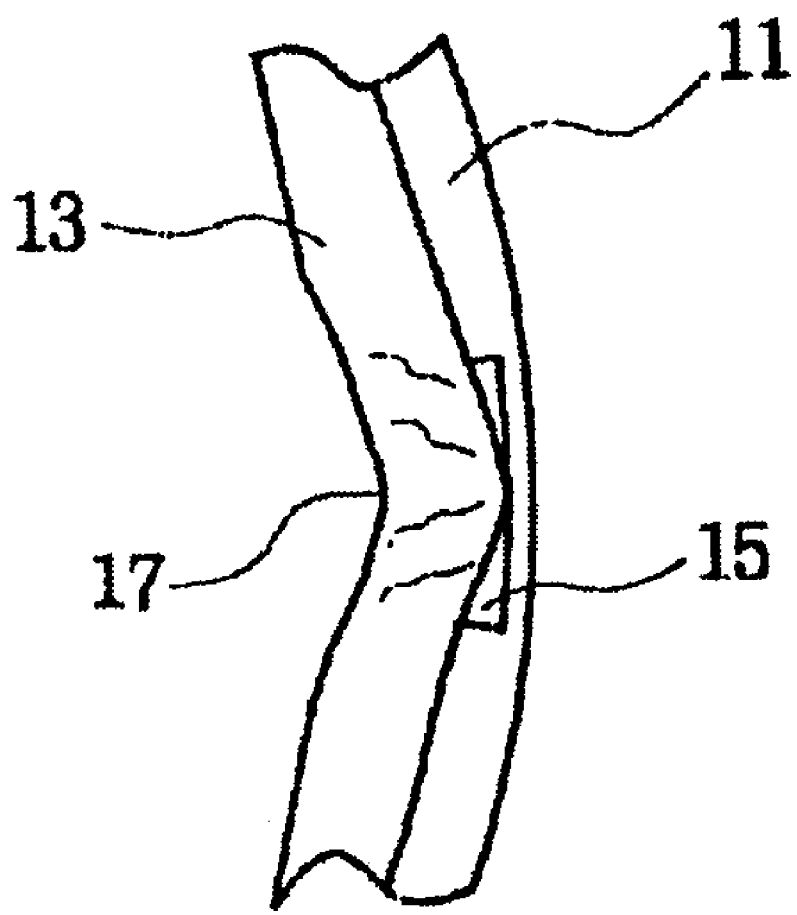

Such distortion tends to be pushed toward a circle circumference, as shown in FIG. 6, whereby a width of the rim loses its balance so as to generate wrinkles or a gap from a surface of the edge of the vessel.

The gap becomes a path through which the pressure of the inner space is discharged externally. Hence, when the pressure of the inner space increases so as to bring about the distortion, the path is formed to discharge the pressure so as to adjust the pressure of the inner space.

A size of the pressure enabling to bring about the distortion depends on elasticity of a packing material, thickness of the rim, width of the rim, area of the long groove, rim width 17 around the long groove, and the like, whereby a demanded option of the packing can be determined by trial-and-error of preparing prototypes and testing optimal pressures thereof.

Besides, it is preferable that the rim width 17 around the long groove is formed to be narrower than other parts in order to make sure the generation of distortion.

Accordingly, the pressure controllable packing according to the present invention has a function of a safety valve as well as a function of sealing the pressurization vessel, thereby enabling to increase the safety of the pressurization vessel.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. In an elastic packing installed at a packing groove formed at an edge of a cover so as to isolate an inner space defined by a vessel and the cover from an outer space, a pressure controllable packing comprising:

first and second rims extending in opposite axial direction pushed by a pressure of the inner space in directions tending to adhere closely to a surface of the packing groove and an edge surface of the vessel;

a support part installed at a circumference end of the packing groove so as to be contacted with the circumference end and connecting the first and second rims to each other; and at least one long groove formed at a portion of the support part at which the first and second rims are connected to the support part and having an open end toward the first rim;

at least one second long groove formed at portion of the support part at which the first and second rims are connected to the support part and having an open end toward the second rim, wherein the first or second rim at a portion where the long groove is formed is pushed in a circumferential direction so as to generate a distorted portion if a pressure of the inner space increases to exceed a predetermined value, and wherein a gap is generated from the distorted portion between surfaces of the first and second rim and the long groove or the edge surface of the vessel so as to reduce the pressure of the inner surface through the gap.

2. The pressure controllable packing of claim 1, wherein a portion of the first or second rim to be placed in the long groove is narrower than a rest portion of the first or second rim.

3. The pressure controllable packing of claim 2, wherein the bottom area of the long groove is formed to be narrower than the entrance area of the long groove.

4. The pressure controllable packing of claim 3, wherein the number of long grooves is at least three.

5. The pressure controllable packing of claim 4, wherein the long grooves is at least four to twenty.

6. The pressure controllable packing of claim 5, wherein the long grooves are formed alternately at an upper and lower face of the support part.

* * * * *